Jan. 24, 1961　　　　E. M. PELL　　　　2,969,491
SELF-EXCITED SYNCHRONOUS MOTOR
Filed Dec. 16, 1959　　　　　　　　　　4 Sheets-Sheet 1

Inventor:
Erik M. Pell,
by John F. Ahern
His Attorney.

Jan. 24, 1961 E. M. PELL 2,969,491
SELF-EXCITED SYNCHRONOUS MOTOR
Filed Dec. 16, 1959 4 Sheets-Sheet 2

Inventor:
Erik M. Pell,
by John F. Ahern
His Attorney.

Jan. 24, 1961 E. M. PELL 2,969,491
SELF-EXCITED SYNCHRONOUS MOTOR
Filed Dec. 16, 1959 4 Sheets-Sheet 3

Inventor:
Erik M. Pell,
by John F. Ahern
His Attorney.

Jan. 24, 1961   E. M. PELL   2,969,491
SELF-EXCITED SYNCHRONOUS MOTOR
Filed Dec. 16, 1959   4 Sheets-Sheet 4

Inventor:
Erik M. Pell,
by John F. Ahern
His Attorney.

United States Patent Office 2,969,491
Patented Jan. 24, 1961

2,969,491

SELF-EXCITED SYNCHRONOUS MOTOR

Erik M. Pell, Scotia, N.Y., assignor to General Electric Company, a corporation of New York Filed Dec. 16, 1959, Ser. No. 859,969

10 Claims. (Cl. 318—181)

This invention relates to an improved self-excited synchronous motor.

In a synchronous motor the stator magnetic core and winding coact to produce a rotating magnetic field. The rotor has a magnetic core which receives this rotating magnetic field and has suitable means to produce a magnetic field cooperating with the rotating magnetic field and in fixed relation to the rotor. Conventionally, the rotor magnetic field is produced by a D.-C. excited winding or by a permanent magnet. Once brought substantially to synchronous speed, the rotor "pulls in" and rotates in unison with the rotating magnetic field despite load torque, thus delivering power at constant speed to the load. Motors of this general type have advantages including constant speed, controllable power factor, and high efficiency. They have a major disadvantage, however, in requiring a separate source of D.-C. rotor exciting current or at least a permanent magnet in the rotor.

The motor of the present invention operates in synchronous motor action and with the advantages of synchronous motor operation without the use of an external source of D.-C. rotor exciting current or permanent magnets. If desired, the motor can be constructed with a self-contained rotor without commutator or slip rings and possessing the elements of ruggedness and reliability heretofore obtainable only with squirrel cage induction motors.

In brief, the motor of the present invention includes a stator with a magnetic core and a stator winding adapted to produce magnetic flux therein. Suitable means, such as excitation with single phase current, unbalanced polyphase current, an auxiliary stator winding, or multi-frequency polyphase current, is provided to produce in the stator a two-component magnetic field having a first magnetic flux component rotating at the desired synchronous motor angular velocity and a second magnetic flux component that is either stationary in relation to the stator or rotates at angular velocity unlike the desired rotor angular velocity or any harmonic or subharmonic thereof. Preferably, to insure the rotor rotating at the angular velocity of the first or excitation frequency, the second frequency should rotate at zero velocity (as, for example, by saturating a stationary stator segment) or at an angular velocity in excess of the first frequency. The rotor is provided with a winding that links the magnetic flux of the rotor core, and hence the magnetic flux from the stator. This winding is provided with a rectifier defining a unidirectional current path through the winding. In operation, the rotor is first brought to approximately the synchronous speed of the first magnetic flux component. At this time the second magnetic flux component induces voltage in the rotor winding, and the rectifier causes a corresponding unidirectional current flow which gives rise to magnetic poles in fixed relation to the rotor and rotating in unison with the rotor. These poles coact with the first magnetic flux component of the stator to give rise to synchronous motor action.

In accordance with a further embodiment of the present invention the rotor is provided with a mutilated squirrel cage winding that operates in induction motor action to accelerate the rotor from standstill. As synchronous speed is approached, this winding coacts with the auxiliary magnetic field to produce stationary poles in relation to the rotor and synchronous motor action.

In another embodiment of the present invention, a single phase motor is provided in which a starting winding receives out-of-phase current flow to provide starting torque and induction motor starting. When synchronous speed is approached, the starting winding is deenergized to provide only single phase excitation and a reversely rotating magnetic field component of maximum intensity for synchronous motor action.

It is therefore a general object of the present invention to provide an improved self-excited synchronous motor.

A further object of the present invention is to provide an improved self-excited synchronous motor that can be constructed in self-contained fashion without the use of commutator, slip rings, or an external source of D.-C. current.

Another object of the present invention is to provide a self-contained synchronous motor not using permanent rotor magnets.

Still another object of the present invention is to provide an improved self-excited synchronous motor in which a secondary stator magnetic field not rotating in unison with the principal stator magnetic field coacts with the rotor to generate the required rotor field.

Yet another object of the present invention is to provide an improved self-excited synchronous motor in which self-contained rectifier elements serve to generate the required rotor field.

Still another object of the present invention is to provide an improved self-excited single phase synchronous motor.

Another object of the present invention is to provide an improved polyphase synchronous motor in which stator unbalance serves to cooperate with rectifier elements for the rotor current to provide the requisite rotor excitation.

Another object of the present invention is to provide an improved self-excited synchronous motor in which a mutilated squirrel cage winding with rectifier elements serves to provide both induction motor starting action and synchronous motor running action.

Still another object of the present invention is to provide an improved self-excited single phase induction motor in which a quadrature armature winding coacts with the rotor to produce starting torque and when the rotor approaches synchronous speed the armature winding and rotor circuit connections are changed to provide both single phase armature action and rotor elements responsive to the reversely rotating magnetic field component to provide synchronous motor action.

The novel features which I believe to be characteristic of my invention are set forth with particularity in the appended claims. My invention itself, however, together with further objects and advantages thereof, will best be understood by reference to the following description taken in connection with the accompanying drawings in which:

Figure 1:
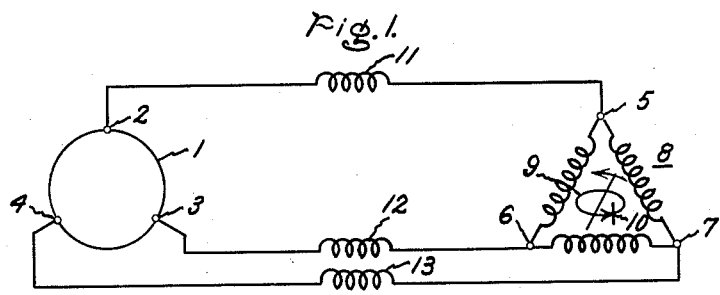
Fig. 1 is a diagrammatic representation of a balanced polyphase form of motor system constructed in accordance with the present invention.

Referring now to Fig. 1, there is shown a poly-phase alternating current generator indicated generally at 1. This generator, as shown, is a three phase generator producing three phase output voltages across terminals 2, 3, and 4. These three phase terminals are connected respectively to the terminals 5, 6, and 7 of the stator winding of the polyphase motor indicated generally at 8. As is well known, the effect of this connection is to give rise to balanced three phase current flow in the stator winding of motor 8 and a magnetic field of constant amplitude within the motor 8 rotating at angular velocity determined by the frequency of the applied voltage. Thus, if the stator windings of motor 8 are of the two pole type, and the frequency of generator 1 is 60 cycles, the stator currents set up a magnetic field rotating at 3600 r.p.m.

For normal induction motor operation, the rotor includes a winding that is either short-circuited or connected through an external resistor. This produces rotor current flow of frequency equal to the difference between actual rotor angular velocity and the angular velocity of the rotating magnetic field. This current in turn reacts with the rotating magnetic field to provide a net driving torque. If the motor is of the synchronous type, the rotor is magnetized electrically or by permanent magnets to define diametrically opposed poles or sets of poles of number equal to the number of poles of the rotating magnetic field. After the motor is started, the rotor poles coact with the rotating magnetic field to provide driving torque.

As shown diagrammatically by the loop 9 and the rectifier 10, Fig. 1, the rotor of the motor 8 has a turn or turns linked by the rotating magnetic field and short-circuited through a rectifier 10. The purpose of this arrangement is described in detail hereafter.

The stator windings 11, 12, and 13 of an auxiliary three phase A-C generator are interposed between the generator 1 and the motor 8, Fig. 1. This auxiliary generator is driven to provide voltages at some frequency other than the frequency of the generator 1. By way of example (and not by way of limitation) the windings 11, 12, and 13 may be the windings of a three phase generator producing 200 cycles per second. This polyphase voltage produces a polyphase 200 cycle current flow in the stator of motor 8 and a rotating magnetic field corresponding to the 200 cycle current. That is, with a two pole stator winding the effect of windings 11, 12, and 13 is to produce in the stator of motor 8 a field rotating at 12,000 r.p.m.

When the rotor of the motor 8 is initially brought approximately to 3600 r.p.m., it is rotating in approximate unison with the rotating magnetic field due to the 60 cycle current flow from generator 1. There is then a relative rotation of 8400 r.p.m. between the rotor of motor 8 and the rotating magnetic field due to the current flow from the generator windings 11, 12, and 13. This 8400 r.p.m. relative rotation causes the winding 9 to "see" a 140 cycle alternating magnetic field. Because of the action of rectifier 10, however, the resultant current flow in winding 9 consists of alternate half-cycles at 140 cycles per second, thereby producing in the rotor of motor 8 diametrically opposed north and south poles. These poles coact with the 3600 r.p.m. rotating magnetic field due to the action of generator 1 and give rise to synchronous motor action of the motor 8. That is, the rotor of motor 8 "locks in" at 3600 r.p.m. and thereafter rotates in unison with the rotating magnetic field due to generator 1.

The action above described may be obtained with arrangements other than that specifically shown in Fig. 1. As hereinafter described in more detail, the secondary field in the motor may be obtained by unbalancing hte three phase voltages appearing across terminals 5, 6, and 7 (thus producing a negative sequence current and a reversely rotating magnetic field), it may be produced by an additional stator winding, or it may be produced by other means. Similarly, the winding of the rotor of the motor may consist of several separate turns with their respective rectifiers, it may consist of a large number of turns constituting a single coil and having a single rectifier, it may be a form of squirrel cage winding, or other arrangements may be used.

It will also be observed that the synchronous motor action above described does not produce motor torque until the motor is rotating substantially at the synchronous speed. It is accordingly usually necessary, as described in further detail hereafter, to provide some means to bring the rotor up to approximately the steady state operating speed.

Figure 2:
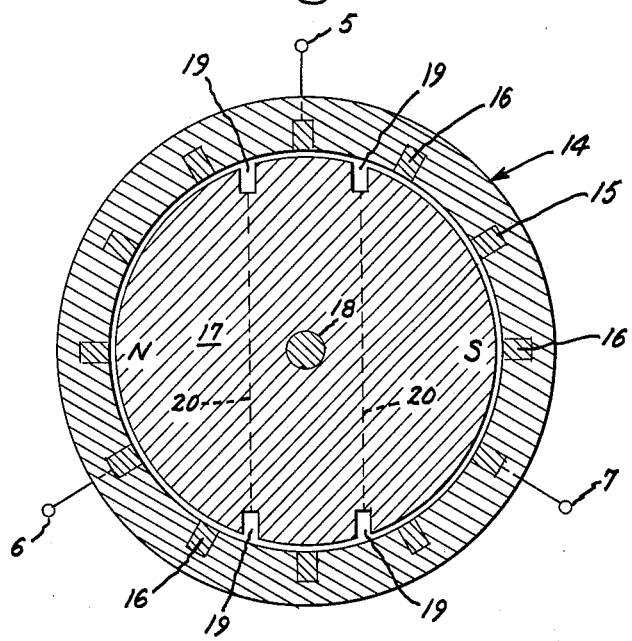
Fig. 2 is an enlarged view in axial cross-section of a polyphase two pole motor proper constructed in accordance with the present invention.

Fig. 2 is a somewhat schematic axial cross-sectional view of a motor proper usable in a system of the type shown generally in Fig. 1. In accordance with usual A.-C. motor construction, the stator 14 is composed of a series of annular silicon steel laminations, each having a series of aligned notches 15 defining internal slots to receive the stator winding. The stator winding 16 is disposed in these slots. This winding is of conventional polyphase induction motor type, such as a closed lap or wave winding extending about the inner periphery of the stator in uniform fashion. The three phase terminals 5, 6, and 7 are taken off this winding at the 120° spaced points as diagrammatically indicated in the drawing, again in accordance with usual polyphase A.-C. motor practice.

The rotor of the motor shown in Fig. 2 consists of a series of circular silicon steel laminations 17, each of which is received on the shaft 18 to define a cylindrical rotor coextensive in axial length with the stator 14. These laminations define four slots 19 along elements of the cylinder formed. A separate closed winding is located in each opposed pair of slots 19 as shown diagrammatically at 20, Fig. 2.

Figure 3:
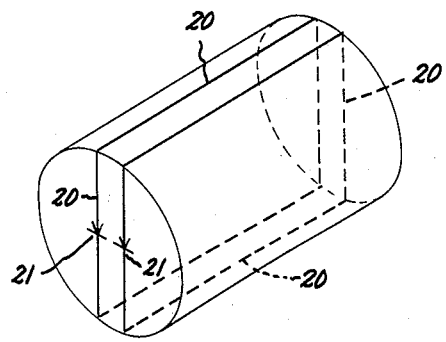
Fig. 3 is a view in perspective with parts in phantom of the rotor of the motor shown in Fig. 2.

The rotor winding arrangement of the motor of Fig. 2 is shown in the perspective phantom view of Fig. 3. The respective windings 20 are here shown in heavy lines. Each is closed by its associated rectifier 21. The cylindrical rotor formed by the laminations is shown in phantom view by the fine lines.

When the motor proper of Figs. 2 and 3 is used in the system shown generally in Fig. 1, the terminals 5, 6, and 7 are energized by two polyphase alternating voltages. One voltage is due to the action of generator 1 and constitutes the main motor energizing voltage. It may, for example, be a 60 cycle voltage. The other alternating voltage is due to the action of the generator windings 11, 12, and 13. This voltage may, for example, be 200 cycles. With the rotor turning at about the synchronous speed associated with the rotating magnetic field from the voltage of generator 1, the rotating magnetic field due to the action of windings 11, 12, and 13 sweeps the rotor to induce voltages in windings 20 therein of about 140 cycles frequency. These voltages are rectified by the rectifiers 21, Fig. 3, to produce unidirectional current flow in each rotor winding with the consequent diametrically opposed poles N and S, Fig. 2, in the rotor 17. It will be noted in this connection that the rectifiers 21 are poled to cause each of the windings 20 to add to the M.M.F. produced by the other.

The motor proper of Figs. 2 and 3 may also be used with other arrangements for producing the desired main rotating magnetic field and a stator field not rotating with the main field. One such alternative arrangement is that of Fig. 8, described hereafter, where unbalanced stator current flow is used for this purpose.

Figure 4:
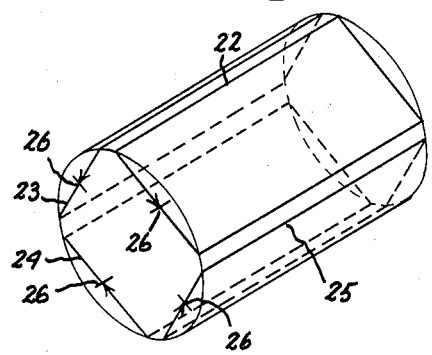
Fig. 4 is a view like Fig. 3 but showing an alternative form of rotor winding suitable for a four pole motor.

It will be understood that if the stator field has more than two poles, the rotor windings are arranged to provide a like number of poles. Fig. 4 is a phantom view similar to Fig. 3 showing a four pole rotor winding arrangement. This rotor may be used with a stator like that of Fig. 2 but wound to produce a four pole rotating magnetic field. In the rotor of Fig. 4, the respective rotor windings 22, 23, 24, and 25 are located with their axes at 90 degree positions about the periphery of the rotor. Each of these windings is short-circuited through a rectifier 26 of proper current conducting direction to produce four poles at the periphery of the rotor, and hence positioned to coact with the main four pole rotating magnetic field. In this case the winding 22 produces a north pole at the adjacent face of the rotor, the winding 23 produces a south pole at the adjacent face of the rotor (and physically spaced 90° from the pole of winding 22), winding 24 produces a north pole (spaced 90° from the pole of winding 23), and winding 25 produces a south pole (spaced 90° from the pole of winding 24). The result is a series of alternate north and south poles properly located to coact with the four pole rotating magnetic field within the rotor and bringing about synchronous motor action. The required alternating induced voltages in windings 22–25 may be obtained by generating a magnetic field in the stator not rotating at the same frequency as the main rotating magnetic field nor any harmonic or subharmonic thereof, as, for example, is shown in Fig. 1.

Figure 5:
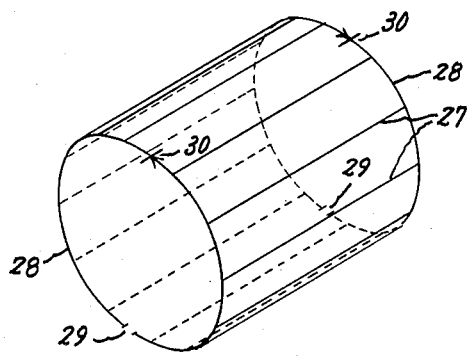
Fig. 5 is a view in phantom similar to Figs. 3 and 4 and showing a mutilated squirrel cage type rotor suitable for use in the motor of the present invention.

Fig. 5 is a somewhat diagrammatic view similar to Figs. 3 and 4 and showing a mutilated squirrel cage type rotor adapted to produce synchronous motor operation in accordance with the present invention. The rotor includes the usual laminations (not shown) forming a cylindrical unit with winding slots disposed along elements of the cylinder. A plurality of conducting bars 27 are disposed in the equally-spaced slots defined by the rotor laminations. End rings 28 connect bars 27 as shown to define a number of interconnections therebetween and extending about the periphery of the rotor. The end rings 28 are opened or mutilated to form gaps at points 29 and receive rectifiers 30 at points diametrically opposed to the gaps 29.

The rotor of Fig. 5 is characterized by induction motor starting characteristics and synchronous motor operating characteristics. At standstill (and up to a speed approaching the synchronous speed) the induction motor characteristics predominate. These characteristics are due to the closed loops defined by the rotor bars and end rings. While these characteristics are to some extent impaired by the gaps 29 and the rectifiers 30, the general operation is similar to that associated with a squirrel cage induction motor rotor, and the induced rotor current flow causes the rotor to try to rotate in unison with the rotating magnetic field produced by stator current.

When the rotor of Fig. 5 approaches the synchronous speed, the secondary magnetic field (due, for example, to the voltage of windings 11, 12, and 13, Fig. 1) induces rotor voltage resulting in current flow through the rectifiers 30. This produces diametrically opposed north and south poles in the rotor of Fig. 5. These poles are located in diametrically opposed position and on the plane defined by the gaps 29 and the rectifiers 30. The field thus produced "locks in" with the main rotating magnetic field and gives rise to synchronous motor action.

Figure 6:
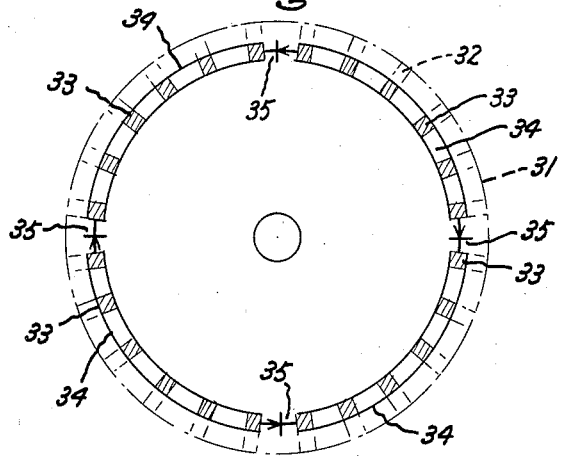
Fig. 6 is an axial cross-sectional view of a four pole mutilated squirrel cage rotor constructed in accordance with the present invention with the magnetic core in phantom.
Figure 7:
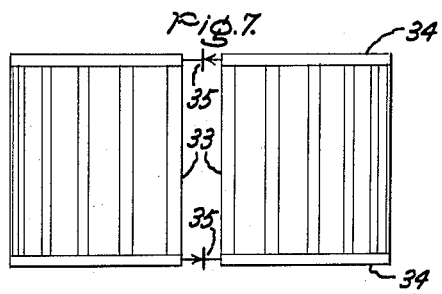
Fig. 7 is a top plan view of the rotor of Fig. 6 with parts shown in diagrammatic form.

Figs. 6 and 7 are axial cross-section and top plan views, respectively, of a modified 4 pole form of the 2 pole rotor of Fig. 5. As shown in phantom at 31, the rotor is defined by a plurality of steel rotor laminations. These have aligned peripheral notches forming slots extending along elements of the cylinder formed by the rotor. The squirrel cage rotor bars 33 are cast in the bottom portions of these slots, respectively, and are connected at their ends by the end rings 34, cast outboard the laminations. As shown, the rotor bars 33 are in four sets of six each, each set being connected at the opposite ends by an appropriate arcuate portion of the end rings 34. Between these respective arcuate portions, the end rings are mutilated or broken, defining gaps which are electrically spanned by the rectifiers shown in diagrammatic view at 35. A total of eight such rectifiers are employed and are electrically oriented to produce alternate north and south poles as the periphery of the rotor is traversed. That is, current flow permitted by the two rectifiers 35 seen in Fig. 7 produces magnetomotive force in the direction out of the rotor and into the stator, current flow permitted by the rectifiers in diametrically opposed position to these two rectifiers gives rise to a similar magnetomotive force out of the rotor and into the stator, and current flow permitted by the other rectifiers produces a magnetomotive force out of the stator and into the rotor. The net effect is to produce the required four poles.

In the foregoing paragraphs describing Figs. 5, 6, and 7, a greater number of rectifiers has been used than is absolutely necessary. In determining the exact maximum and minimum numbers of rectifiers which may be used, the following criteria are followed. The maximum number of rectifiers and gaps which may be utilized may be determined empirically by determining the number of closed current circulating loops which will be sufficient to start the squirrel cage in rotation upon application of voltages to the device. This will vary from machine to machine depending upon the voltage and currents utilized, the inertia of the rotor, and load requirements. The minimum number of rectifiers and gaps which is operative to convert a squirrel cage rotor to synchronous operation is selected according to the following criteria. One end ring of the squirrel cage must be divided into as many segments as corresponds with the number of poles of the stator. The segments are separated from one another by alternate rectifiers and gaps, in which case the rectifiers are similarly poled. After the number of rectifiers has been selected in accord with the foregoing criteria for one end ring of the squirrel cage, attention may be given to the opposite end ring. Generally speaking, at the position opposite to any rectifier on the first ring, the opposite end ring must be solid or contain a rectifier. Opposite any gap in the first end ring, the other end ring should have a gap. Numbers of rectifiers intermediate the maximum and minimum may be obtained by substituting for any gap a rectifier so poled as to prevent current flow at the same time the aforementioned diodes are blocking. Additionally, the end rings may be broken into a greater number of segments.

It will be noted that the rotor arrangements of Figs. 5–7, inclusive, use squirrel cage rotor windings that are mutilated in the sense of having gaps in the end rings. It will also be noted that these rotors each are provided with rectifiers closing the circuits across at least some of the mutilated portions of the end rings. These rectifiers are so located and poled as to produce—upon an alternating field "seen" by the rotor—the desired poles for synchronous motor action. To the extent that the squirrel cage rotor windings are otherwise closed, the current flow caused therein gives rise to induction motor torque. This may be used to bring the rotor up approximately to synchronous speed, thus providing a desirable self-start characteristic.

The rectifiers used in the rotors of Figs. 5–7, inclusive, may be located as mechanical considerations dictate. Preferably, they are located in the gaps or mutilations of the end rings, where some space is available and circuit connections can readily be made. They may be located in other positions and, if desired, can be located remote from the rotor by taking off the electrical connections through slip rings.

Figure 8:
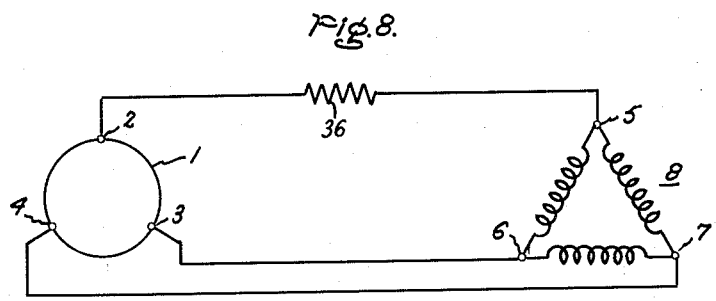
Fig. 8 is a fragmentary drawing similar to Fig. 1 but showing an alternative arrangement for creating the secondary magnetic field.

Fig. 8 shows an alternative manner of producing a secondary stator field. In the construction of this figure the normally balanced voltages applied to the terminals 5, 6, and 7 of the motor 8 are unbalanced to some degree by the action of the impedance 36 inserted in one of the three line connections. This unbalance gives rise to a degree of motor current unbalance which in turn can be looked upon as creating positive, negative, and zero phase sequence current flows in the stator. The positive phase sequence current predominates and produces the main rotating magnetic field, with which the rotor coacts in synchronous motor action. The negative sequence current produces a reversely rotating magnetic field and the zero sequence current produces an alternating but non-rotating magnetic field. Since both of these latter fields are swept by the rotating rotor, they produce alternating rotor voltage which is rectified to produce the rotor poles as required for the synchronous motor action of the present invention. The motor 8 proper in Fig. 8 may be as shown in Figs. 1–7.

Figure 9:
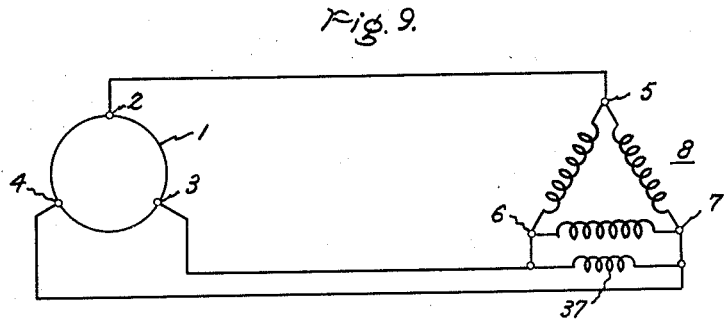
Fig. 9 is a drawing similar to Fig. 8 showing still another alternative arrangement for creating the secondary magnetic field.

Fig. 9 shows still another arrangement for producing the requisite secondary magnetic field. In this instance the stator of motor 8 receives balanced poly-phase voltages, thus producing the main rotating magnetic field. A supplemental stator winding 37 is connected in parallel with one of the stator phase windings and is physically located in substantial coincidence therewith. This additional stator winding can be looked upon as acting in normal single phase fashion to produce a positive sequence rotating magnetic field rotating in unison with that of the main stator windings, together with a negative sequence reversely rotating magnetic field. The latter sweeps across the rotor at substantially twice the synchronous speed to induce voltages of substantially twice the applied frequency of the applied voltages. The resultant induced voltages are rectified by the rotor to produce the requisite unidirectional magnetic field in the rotor and the synchronous motor action described herein. The rotor construction used with the motor in Fig. 9 may be any of the forms shown in Figs. 1–7 or other structure responsive to the negative sequence stator field to produce the required rotor poles.

Figure 10:
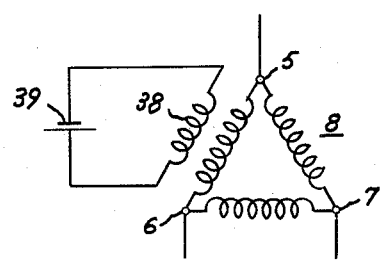
Fig. 10 is a schematic drawing illustrating still another alternative arrangement for creating the secondary magnetic field.

Fig. 10 shows yet another arrangement for producing the secondary magnetic field. In this structure the stator is provided with an additional winding 38 which receives D.-C. voltage from a suitable source, such as indicated at 39. The effect of this winding is to define a stationary magnetic field which is swept by the rotor to induce alternating voltage therein. The resultant voltage is rectified by the rotor to produce the poles required for synchronous motor action as described above. It will be noted that while the field due to winding 38 is constant with time and located in fixed position, it nevertheless induces alternating voltages in the rotor. Alternatively, a rectifying diode substituted at 39 results in a voltage through field coil 38 due to the rotating field produced by the other field coils. In addition to the preceding methods of obtaining the objects of the invention, these objects may be achieved by energizing the stator with a second signal which has zero angular velocity or in another manner of expression is spacially static. This may be accomplished by a non-symmetrical arrangement of field pieces or design thereof so that angularly varying saturation is obtained. These and other equivalent expedients result in the basic phenomenon by which the ends of the invention are achieved, namely the existence of an angularly varying magnetic reluctance around the circumference of the stator.

Figure 11:
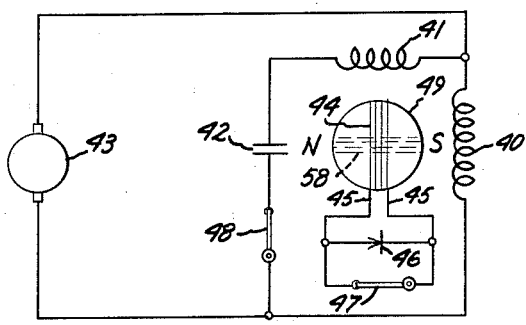
Fig. 11 is a diagram showing a single phase motor system constructed in accordance with the present invention.
Figure 12:
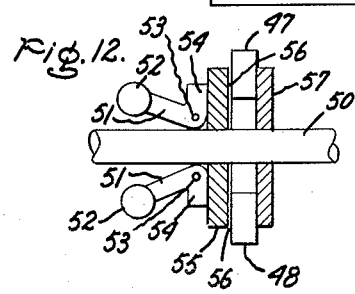
Fig. 12 is a somewhat diagrammatic view in elevation of a speed-responsive switch mechanism of the kind that may be used in a motor system such as that of Fig. 11.

Figs. 11 and 12 show in somewhat diagrammatic view a self-starting single phase motor constructed in accordance with the present invention. In the motor shown, the main armature or stator winding 40 is of normal single phase motor construction. The turns of the starting winding 41 are disposed to produce flux physically spaced 90 electrical degrees from the flux of the main armature winding 40. The capacitor 42 serves to give the current flow through the winding 41 a phase lead approaching a quarter cycle, so that the net effect of the single phase voltage produced by the generator 43 is to produce a rotating magnetic field component within the stator of the motor.

The rotor of the motor of Fig. 11 is shown generally at 49. It consists of silicon steel laminations mounted on a suitable shaft and having slots in approximately diametrically opposed relation to receive the turns of the rotor winding 44. The ends 45 of the winding 44 are connected through the rectifier 46 and by the speed-actuated switch 47 which is in parallel circuit relation with the rectifier 46. A second speed-actuated switch 48 is provided in the circuit of the capacitor 42 and the starting winding 41.

The switches 47 and 48 are normally closed speed-sensitive switches which close at all speeds below a predetermined actuating speed. They may be any one of many constructions well known to the art, either being mounted on the rotor 49 for rotation therewith or mounted in fixed position and acted upon by speed-sensitive elements on the rotor. Slip rings (not shown) may be used as required to make circuit connections between the rotor and the stationary parts.

Fig. 12 shows one construction for these switches. In the construction shown, the rotor shaft is indicated at 50 and carries a pair of diametrically opposed crank arms 51 having flyballs 52 and pivotally supported at 53. The flyballs 52 tend to swing radially outwardly with increasing force as the speed of rotation of shaft 50 rises. The crank arms 54 thus bear against the axially shiftable plate 55 with progressively increasing force and impart like increasing force to the actuating elements 56 of the switches 47 and 48. These switches are of the pressure responsive type actuated by pressure on the actuating elements 56 and are supported in fixed axial position on the shaft 50 by the fixed plate 57.

Each of the switches 47 and 48 is of the normally closed type. Thus, when the motor of Fig. 11 is well below normal operating speed, the switches 47 and 48 are both closed. Due to the action of the circuit through switch 48, a dominant positively rotating component of magnetic field is produced in the stator of the motor at this time. Due to the action of switch 47, which is also closed at this time, alternating current is free to flow in the winding 44. The latter accordingly acts as an induction motor winding, with the current flow in the winding 44 coacting with the dominant positively rotating magnetic field to produce an average torque tending to cause the rotor 49 to rotate with the positively rotating magnetic field. The rotor 49 accordingly begins to rotate and picks up speed due to this induction motor action of winding 44.

When the rotor reaches a predetermined speed, the pressure on the switch 48 becomes sufficient to actuate it and open the circuit through the capacitor 42 and the starting winding 41. The motor is now excited only by single phase stator current flow. This current flow can be looked upon as having two components of like strength. One is the positive sequence component of current, producing a rotating magnetic field rotating in the same direction as the rotor and at the synchronous speed. The other component is the negative sequence component current producing a rotating magnetic field rotating in the opposite direction to the rotor and at the synchronous speed.

The switch 47 opens when the rotor 49 approaches the synchronous speed. Preferably, this occurs after or at the time the switch 48 opens. Thus, when the switch 47 opens there is present both the positive sequence current flow in the stator and the positively rotating magnetic field, and the equal negative sequence current flow and the equal reversely rotating magnetic field. The latter magnetic field rotates at substantially twice the synchronous speed in relation to the rotor 49 and induces a voltage in the winding 44 of substantially twice the frequency of the voltage of the generator 43. The rectifier 46 (which is not short-circuited at this time) permits only the alternate half cycles of current flow through the winding 44, thus producing opposed north and south poles in the rotor 49, as indicated as N and S, Fig. 11. When these poles are created by the aforementioned opening of switch 47, the rotor 49 then locks in with the positively rotating component of the field produced by the single phase stator winding, thus giving rise to single phase synchronous motor action.

The exact speed at which the switch 48 opens is determined by the required starting characteristic of the motor. If desired, a short-circuited winding 58 may be provided on the rotor in quadrature with the winding 44. Once the rotor is rotating at some speed less than synchronous, this winding coacts with the winding 44 and the single phase current flow through the stator winding 40 to provide induction motor drive torque even in the absence of current flow through winding 41.

The switch 47 is opened only when the rotor reaches sufficient speed to "lock in" under the opposed north and south rotor poles produced by rectifier 46. Since the negative sequence field component has its maximum value when the winding 41 carries no current, the switch 47 preferably opens after the switch 48. However, since the current flow in the winding 41 does not as a practical matter balance that in the winding 40, and there is inherently some departure from the balanced polyphase energization of the stator of the motor of Fig. 11, there is some negative sequence current component at all times and hence some reversely rotating magnetic field even with the switch 48 closed. Opening the switch 48, however, maximizes the reversely rotating field and hence the induced voltage in the rotor winding 44.

While I have shown and described particular embodiments of the present invention, it will be understood that various modifications and alternative constructions may be made without departing from its spirit and scope. Such modifications include other arrangements for creating the secondary magnetic field in the motor rotor, other arrangements for rectifying the induced rotor voltage to provide rotor poles, and alternative starting arrangements. In addition, these respective constructions may be combined with each other in varying arrangements so long as the rotor is swept by a secondary magnetic field when rotating at synchronous speed and is so arranged that such field produces diametrically opposed poles for synchronous motor action.

What I claim as new and desire to secure by Letters Patent of the United States is:

1. A self-excited synchronous motor comprising in combination: a stator having a magnetic core and a stator winding adapted to produce magnetic flux therein; means to impart current flow to said winding to produce a first magnetic flux component rotating at one predetermined angular velocity in relation to the core and a second flux component not rotating at that predetermined angular velocity in relation to the core or any harmonic thereof; a rotor having a magnetic core adapted to receive the magnetic flux of the stator; a rotor winding on the rotor linking the magnetic flux in the core thereof; and means including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator winding, whereby the rotor is driven in synchronous motor action at the angular velocity of said first magnetic flux component.

2. A self-excited synchronous motor comprising in combination: a stator having a magnetic core and a stator winding adapted to produce magnetic flux therein; means to impart current flow to said winding to produce a first magnetic flux component rotating at one predetermined angular velocity in relation to the core and a second flux component not rotating at that predetermined angular velocity in relation to the core; a rotor having a magnetic core adapted to receive the magnetic flux of the stator; a rotor winding on the rotor linking the magnetic flux in the core thereof; means including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator winding, whereby the rotor is driven in synchronous motor action at the angular velocity of said first magnetic flux component; and means operable independently of said synchronous motor action to bring the rotor up to approximately the angular velocity of said first magnetic flux component.

3. A self-excited synchronous motor comprising in combination: a stator having a magnetic core and a stator winding adapted to produce magnetic flux therein; means to impart current flow to said winding to produce a first magnetic flux component rotating at one predetermined angular velocity in relation to the core and a second flux component not rotating at that predetermined angular velocity in relation to the core; a rotor having a magnetic core adapted to receive the magnetic flux of the stator; a rotor winding on the rotor linking the magnetic flux in the core thereof; means including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator winding, whereby the rotor is driven in synchronous motor action at the angular velocity of said first magnetic flux component; and speed-responsive elements operable to define a circuit through the rotor winding independent of the last means to bring the rotor approximately to said one predetermined velocity in induction motor action.

4. A self-excited synchronous motor comprising in combination: a stator having a magnetic core and a stator winding adapted to produce magnetic flux therein; means to impart current flow to said winding to produce a first magnetic flux component rotating at one predetermined angular velocity in relation to the core and a second flux component not rotating at that predetermined angular velocity in relation to the core; a rotor having a magnetic core adapted to receive the magnetic flux of the stator; a rotor winding on the rotor linking the magnetic flux in the core thereof; and means integral with the rotor and including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator winding, whereby the rotor is driven in synchronous motor action at the angular velocity of said first magnetic flux component.

5. A self-excited single phase synchronous motor comprising in combination: a stator having a magnetic core and a stator winding adapted for single phase excitation and operable to produce magnetic flux in the core having a first flux component rotating at synchronous forward speed and a second flux component rotating at synchronous reverse speeds a rotor having a magnetic core adapted to receive the magnetic flux of the stator; a rotor winding on the rotor linking the magnetic flux in the core thereof; and means including a rectifier defining a unidirectional current path through said rotor winding, whereby with the rotor rotating in substantial unison with the first flux component the second flux component induces an alternating voltage in said rotor winding, a unidirectional current flow in said winding, and magnetic flux rotating in unison with the rotor and linking the stator winding, whereby the rotor is driven in synchronous motor action at the angular velocity of said first magnetic flux component.

6. A self-excited single phase synchronous motor comprising in combination: a stator having a magnetic core and a stator winding adapted for single phase excitation and operable to produce magnetic flux in the core having a first flux component rotating at synchronous forward speed and a second flux component rotating at synchronous reverse speed; a rotor having a magnetic core adapted to receive the magnetic flux of the stator; a rotor winding on the rotor linking the magnetic flux in the core thereof; means including a rectifier defining a unidirectional current path through said rotor winding, whereby with the rotor rotating in substantial unison with the first flux component the second flux component induces an alternating voltage in said rotor winding, a unidirectional current flow in said winding, and magnetic flux rotating in unison with the rotor and linking the stator winding, whereby the rotor is driven in synchronous motor action at the angular velocity of said first magnetic flux component; and starting elements operable to reinforce said first flux component in relation to the second flux component at least when the rotor is at standstill and operable to define a circuit through the rotor winding independent of said last means until the rotor is substantially at synchronous speed in relation to said first flux component.

7. A self-excited polyphase synchronous motor system comprising in combination: a stator having a magnetic core and a stator winding adapted for polyphase excitation; means operable to excite said winding with unbalanced polyphase voltages to produce magnetic flux in the core having a first flux component rotating at one predetermined angular velocity in relation to the core and a second flux component rotating at a different predetermined angular velocity in relation to the core; a rotor having a magnetic core adapted to receive the magnetic flux of the stator; a rotor winding on the rotor linking the magnetic flux in the core thereof; and means including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator winding, whereby the rotor is driven in synchronous motor action at the angular velocity of said first magnetic flux component.

8. A self-excited polyphae synchronous motor system comprising in combination: a stator having a magnetic core and a stator winding adapted for polyphase excitation; means operable to excite said winding with current having a polyphase current component of a first predetermined frequency to produce a first flux component rotating at one predetermined angular velocity in relation to the core and a current component operable to produce a second flux component not rotating at said one predetermined angular velocity in relation to the core; a rotor having a magnetic core adapted to receive the magnetic flux of the stator; a rotor winding on the rotor linking the magnetic flux in the core thereof; and means including a rectifier defining a unidirectional current path through said rotor winding, whereby with the rotor rotating in substantial unison with the first magnetic flux component the second magnetic flux component induces an alternating voltage in said rotor winding, a unidirectional current flow in said rotor winding, and magnetic flux rotating in unison with the rotor and linking the stator windings, whereby the rotor is driven in synchronous motor action at the angular velocity of said first magnetic flux component.

9. A self-excited synchronous motor with induction motor starting characteristics comprising in combination: a stator having a magnetic core and a stator winding adapted to produce magnetic flux therein; means to impart current flow to said winding to produce a first magnetic flux component rotating at one predetermined angular velocity in relation to the core and of a predetermined number of poles, and a second magnetic flux component not rotating at that predetermined angular velocity in relation to the core; a rotor having a magnetic core adapted to receive the magnetic flux of the stator; a rotor winding with longitudinal bars and end rings defining a squirrel cage conformation, the end rings being mutilated to define a segment for each pole of said first magnetic flux component; and rectifier elements electrically connecting the segments of the end rings to permit unidirectional current flow and the creation of poles in the rotor to give rise to synchronous motor action with respect to said first magnetic flux component when the rotor is rotating at substantially synchronous speed.

10. A rotor construction for a self-excited synchronous motor having a stator producing a first magnetic flux component rotating at one predetermined angular velocity and a second magnetic flux component not rotating at that predetermined angular velocity, the rotor comprising: a magnetic core adapted to receive the magnetic flux of the stator; a rotor winding with longitudinal bars and end rings defining a squirrel cage conformation, the end rings being mutilated to define a segment for each pole of said first magnetic flux component; and rectifier elements electrically connecting the segments of the end rings to permit unidirectional current flow and the creation of poles in the rotor to provide synchronous motor action with respect to said first magnetic flux component when the rotor is rotating at substantially synchronous speed.

No references cited.